Dec. 6, 1960  F. J. KENT ET AL  2,963,151
DIE CHANGING APPARATUS FOR METAL EXTRUSION PRESS
Filed Oct. 18, 1956  5 Sheets-Sheet 3

INVENTOR
Francis J. Kent
Otto Hammon
BY Eric T. Vogel
ATTORNEYS

Dec. 6, 1960 F. J. KENT ET AL 2,963,151
DIE CHANGING APPARATUS FOR METAL EXTRUSION PRESS
Filed Oct. 18, 1956 5 Sheets-Sheet 4

INVENTOR
Francis J. Kent
Otto Hammon
BY Eric T. Vsely
ATTORNEYS

Dec. 6, 1960  F. J. KENT ET AL  2,963,151
DIE CHANGING APPARATUS FOR METAL EXTRUSION PRESS
Filed Oct. 18, 1956  5 Sheets-Sheet 5

INVENTOR
Francis J. Kent
Otto Hammon
BY Eric T. Vogel
ATTORNEYS

United States Patent Office 2,963,151
Patented Dec. 6, 1960

2,963,151

DIE CHANGING APPARATUS FOR METAL EXTRUSION PRESS

Francis J. Kent, Forest Hills, N.Y., Otto Hammon, Scotch Plains, N.J., and Eric T. Vogel, Elmhurst, N.Y., assignors to Baldwin-Lima-Hamilton Corporation, Philadelphia, Pa., a corporation of Pennsylvania Filed Oct. 18, 1956, Ser. No. 616,800

8 Claims. (Cl. 207—1)

This invention relates to an improvement in extrusion presses and especially extrusion presses for the extrusion of copper, copper alloys including brass, aluminum, aluminum alloys and other metals.

In the extrusion of solid shapes from copper, brass and other metals, it is customary to insert a hot billet into the billet container of the press and extrude the metal through a die by the application of high pressure to the billet. In the extrusion of hollow shapes from copper, brass and similar metals, the billet is pierced with a mandrel and the mandrel extends into the orifice of the die during the extrusion. When producing large tubular shapes in this manner, it is of advantage to obturate the extrusion orifice of the container during piercing.

The hot metal passing through the die of the press heats the die and causes the surfaces over which it passes to wear rapidly, with the result that the dies must be removed periodically from the press for inspection and lubrication or replacement with a new die. Furthermore, it is necessary to change the die each time the shape of the extrusion is changed, since the orifice of the die controls that shape.

The manual removal of the die from a press, even with the use of suitable hand tools is a time consuming task which is made arduous by the elevated temperature of the die and press. During die changing there is a complete interruption of the operation of the press. Frequent die changes cause the loss of much valuable press operating time and a material reduction in the volume of extruded products produced by a press.

In using an obturating disk to close the billet container during piercing and forging operations, manual exchange of the obturating disk and dies often requires so much time that it is necessary to reheat the billet, which is not economical.

It is the object of this invention to provide an extrusion press construction and a method for the operation of an extrusion press which permits the die to be changed rapidly and efficiently with a minimal interruption in the operation of the press and with an increase in the output of extruded products therefrom.

Another object of this invention is to provide an extrusion press construction and a method for the operation of the press, which mechanically removes the die from the press, places it in a location in which it can cool, be visually inspected with convenience, lubricated and otherwise serviced and which mechanically returns the same or a different die to its operating position in the press.

Another object of this invention is to provide an extrusion press construction and a method for the operation of the press which mechanically removes the die from the press, which places it in a location in which it can be conveniently inspected, which can be used to withdraw worn or otherwise defective dies for repair or discard, and which returns a die to its operating position in the press.

Still another object is to provide an extrusion press construction and a method of operation which alternately positions an obturating disk and an extrusion die over the extrusion orifice of the billet container of the press and permits the forging (upsetting) or the piercing of the billet or both while the orifice of the billet container is closed by an obturating disk, followed by the removal of the obturating disk, insertion of a die and extrusion of the forged or pierced billet through the die positioned at the orifice of the billet container, all this being performed in sufficiently short time that reheating of the billet is not necessary.

Various other objects and advantages of this invention will become apparent as this description proceeds.

The metal extrusion press, in accordance with our invention, includes a number of features which are more or less standard construction in extrusion presses. It comprises a perforated platen and a die adapted to register with the opening through the platen. It has a movable billet container provided with a billet chamber which is aligned with the opening through the platen, and with a suitable means for moving the billet container toward and away from the die and platen. This press is provided with the usual main hydraulic cylinder and the associated parts necessary to apply pressure for forcing metal through the die. It may be provided with a hydraulic piercing cylinder, piercing mandrel and the associated parts required to adapt it for the production of tubes and other hollow extrusions.

One aspect of the novelty of our press resides in the cooperative combination in such a press of a die carrier and a die changing mechanism. The die carrier is positioned on the face of the platen and may be of conventional type adapted to move the die of the press into and out of register with the billet chamber of the billet container and the opening through the platen, and to hold it in registry during the extrusion operation. This die carrier may be in the form of a turret or other suitable form, although we prefer to use a die slide adapted to be moved horizontally toward and away from the extrusion axis of the press by the action of a hydraulic cylinder. An essential feature of this die carrier is that it permits the removal of a die from its operational position with respect to the carrier by movement of the die in a plane normal to the longitudinal axis of the press.

The die changer which forms the second part of this cooperative combination is positioned adjacent to the die carrier and comprises a means for mechanically removing a die from the die carrier, when the die carrier is in the position in which the die is out of register with the billet chamber of the billet container. This die changer is provided with a zone in which the die can cool and in which it is located convenient for visual inspection and lubrication or other servicing which it may require. It is also provided with means for holding a plurality of dies and for returning a die from the visual inspection zone to its operational position with respect to the die carrier.

The means for conveying a die from the visual inspection zone of the die changer to its operational position with respect to the die carrier forms an essential part of the die changer and, in a preferred embodiment of the die changer, comprises the combination of a fixed chute, a means for conveying a die from the visual inspection zone to this chute and a movable means for permitting a die to move from the fixed chute into its operational position with respect to the die carrier. A preferred form of this die changer is also provided with a means for withdrawing a worn or defective die for repair or discard by moving it from the inspection zone to a position outside the die changer. The mechanism of the die changer may be power operated by means such as a fluid motor or a solenoid.

In the preferred embodiment of our invention, a die having a generally cylindrical surface is mechanically lifted from a slot in the die chute of the die carrier and caused to roll into the visual inspection zone of the die changer under the force of gravity. After the die has been cleaned and inspected and if proper, lubricated it is either raised and caused to roll out of the die changer to be withdrawn, or raised and caused to roll back to the die carrier and drop into the die slot of the die carrier. In each case, the movement of the die is in a plane normal to the main axis of the press.

The movement of the die by causing it to roll under the force of gravity is a particularly advantageous feature of our invention. This method of handling the die both simplifies the mechanism required for the movement of the die into and out of a location in which it can be conveniently cooled, inspected and lubricated or otherwise serviced and minimizes the possibility of damage to the die itself, since no clamps, tongs or other tools which grasp the die are required to move it and there is no danger of dropping or otherwise inadvertently marring the die.

A preferred embodiment of the extrusion press in accordance with our invention and the method for its operation are illustrated by the accompanying drawings, in which like reference characters are used to refer to like parts, wherever they may occur. For the purpose of simplicity, these drawings omit many of the more or less standard features of the extrusion press which are well known to the art and which do not form a feature of novelty in our improved press.

Figure 1:
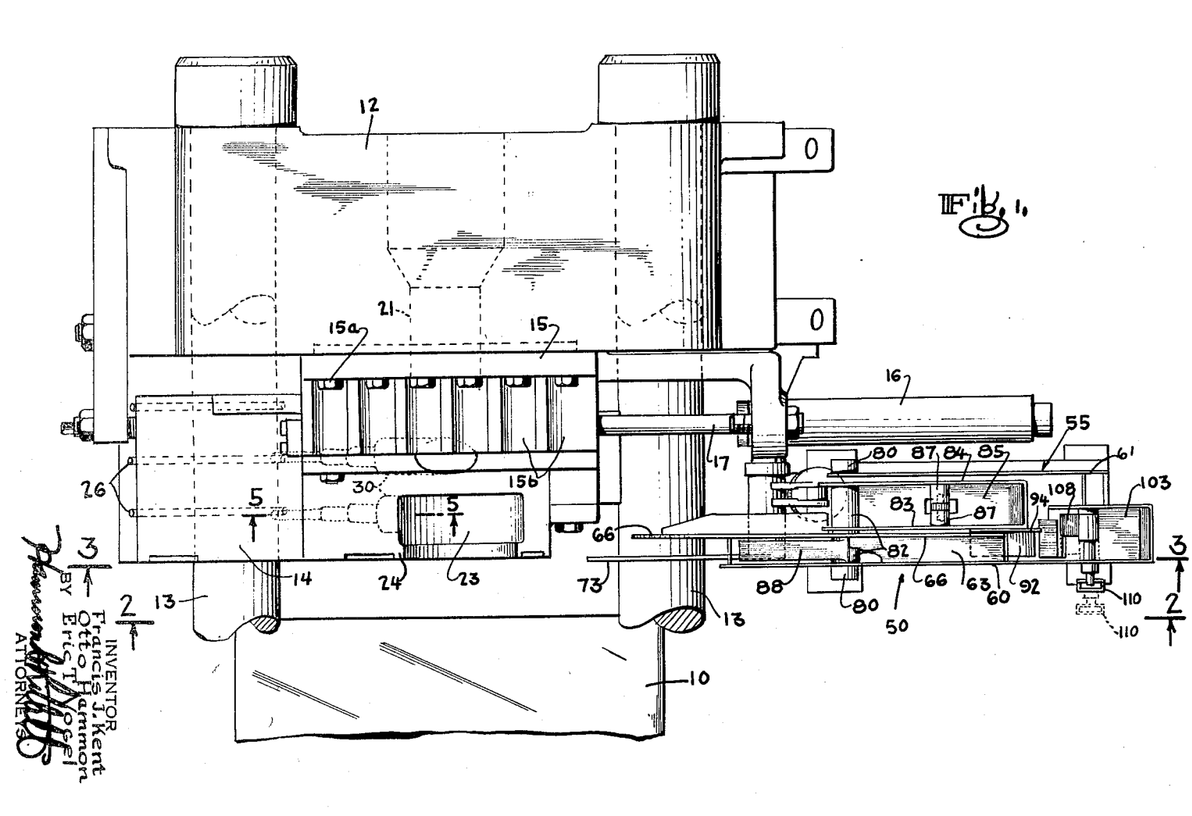
Fig. 1 is a fragmentary plan view of an extrusion press embodying our invention, showing the platen and adjacent parts of the press, but for simplicity, omitting the die and associated parts, as well as the main hydraulic cylinder and associated parts.
Figure 2:
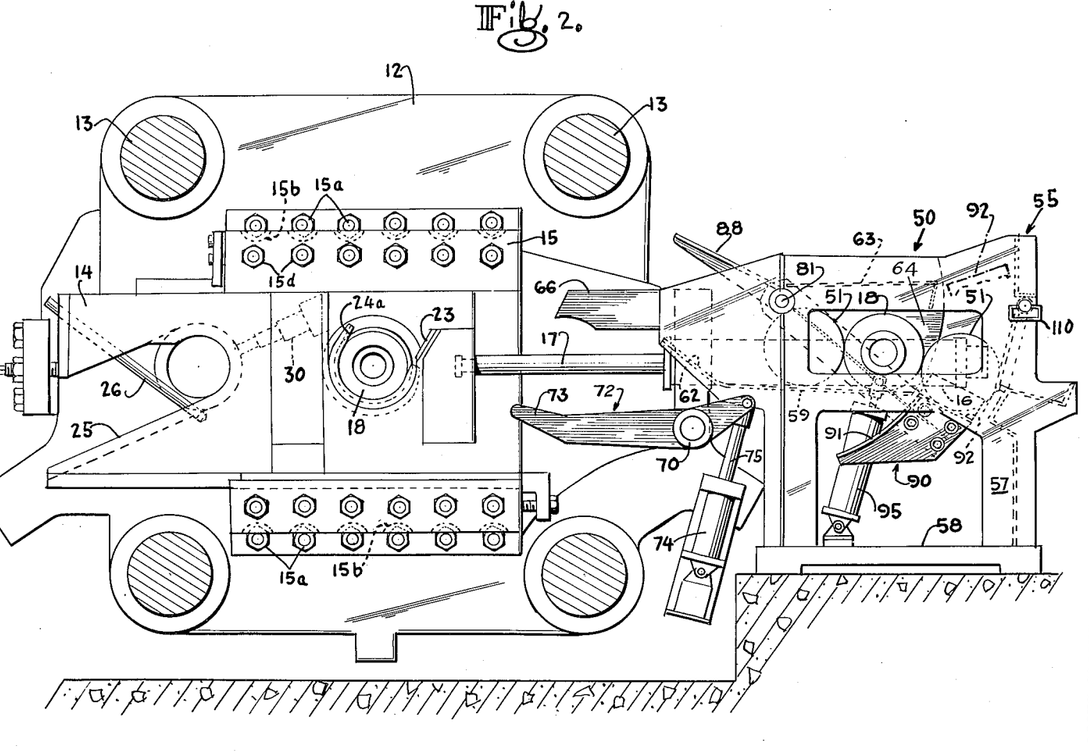
Fig. 2 is a transverse, elevational view with parts in cross-section taken along the section line 2—2 of Fig. 1, but showing a die in position in the die slot.
Figure 3:
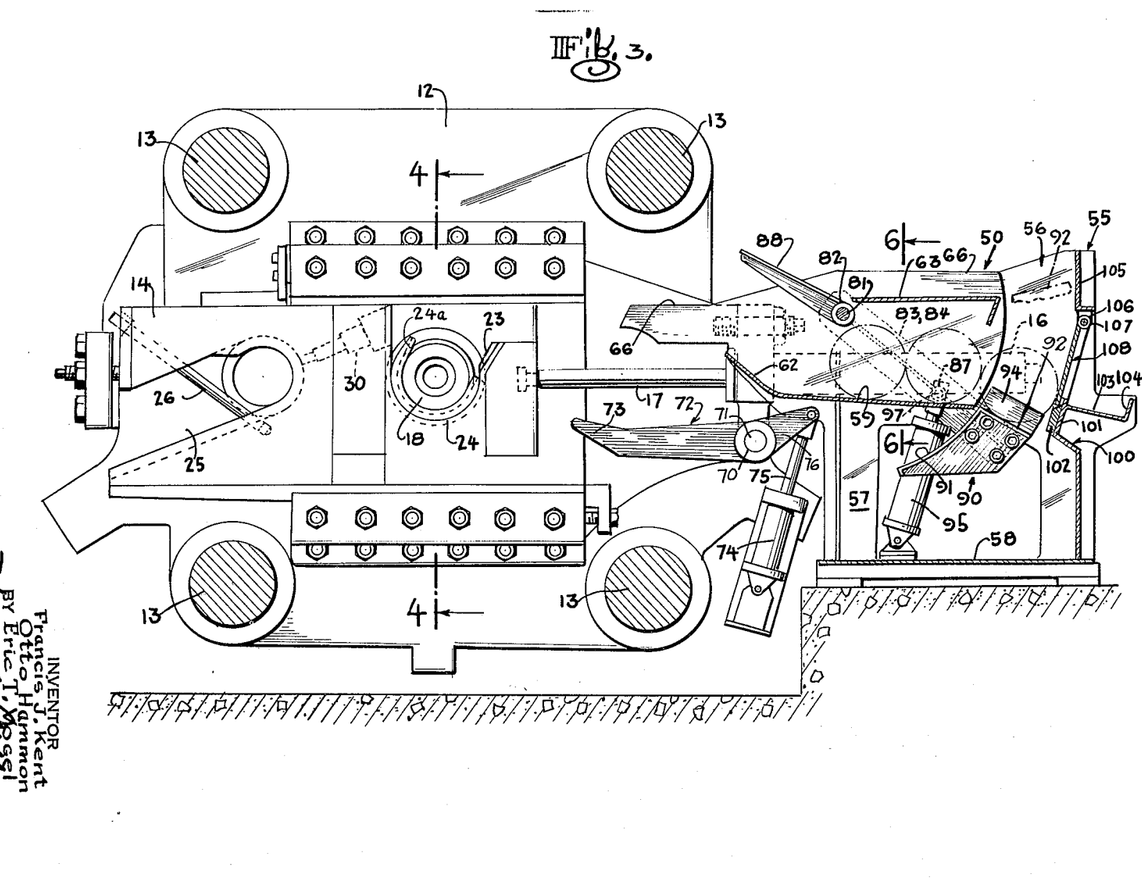
Fig. 3 is a cross-sectional view taken along the section line 3—3 of Fig. 1, also showing a die in position.
Figure 4:
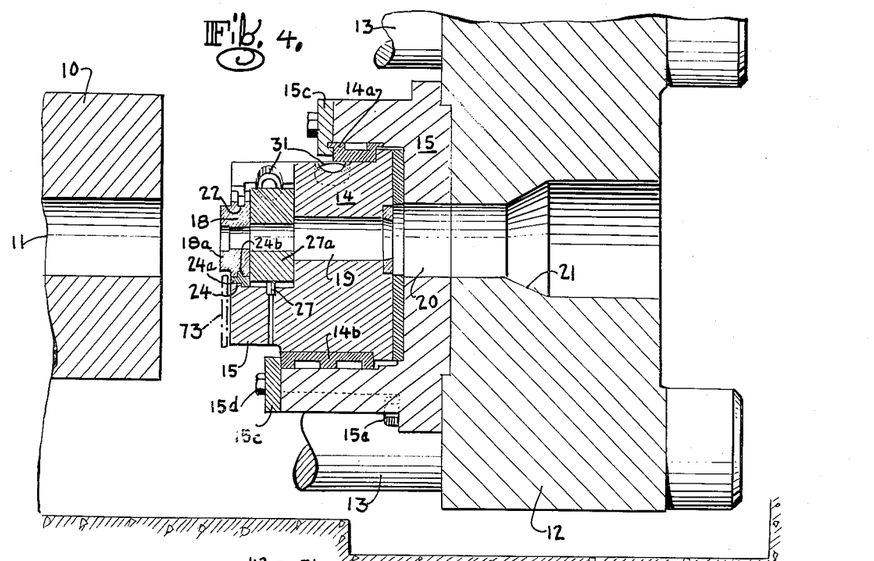
Fig. 4 is a longitudinal, sectional view taken along the section line 4—4 of Fig. 3.

Referring to Figs. 1 and 4, the platen of the press is shown at 12 and the tie rods at 13, 13. The billet container in retracted position is indicated at 10 and the billet chamber at 11. As best shown by Figs. 2, 3 and 4, the die slide 14 is mounted in a die slide holder 15 secured to the face of the platen 12 by a plurality of cap screws 15a mounted in semicircular recesses 15b in the top and bottom faces of the die slide holder 15. The die slide 14 is slidably mounted on adjustable bearing supports 14a and 14b (Fig. 4) in the die slide holder 15 and is held therein by cap plates 15c secured to the face of die slide holder 15 by a series of cap screws 15d. The die slide 14 is adapted to slide horizontally across the face of the platen by the action of the hydraulic cylinder 16, shown by Fig. 1, the piston of which is attached to the die slide 14 by the rod 17. The hydraulic cylinder 16 moves the die slide 14 to bring the orifice of the die 18 into and out of registry with the billet chamber 11 of the billet container 10 along the extrusion axis of the press.

The billet container 10 is slidably mounted and may be shifted toward or away from the die 18 by the action of a hydraulic cylinder or cylinders not shown by the drawings and can be shifted to a position in which the billet chamber 11 is in tight contact with the die 18. In this position a billet in chamber 11 may be extruded through the die 18. As best shown by Fig. 4, the die slide 14 is provided with an opening 19 and the die slide holder 15 with an opening 20, and the platen 12 with an opening 21 through which the extruded product issuing from the die 18 may pass out of the press.

The die 18 has a generally cylindrical outer surface surrounding its orifice which carries a circular groove 22, by which the die 18 is replaceably mounted in the generally horse shoe shaped die slot 23 in the die slide 14. The horse shoe shaped slot 23 is provided with a flange 24 holding a horse shoe shaped die retainer 24a in place on the die slide 14. The die retainer 24a in turn has a flange 24b adapted to fit into the groove 22 of the die. When the flange 24b is positioned in the groove 22 the die 18 is held in the die slide 14, against movement in the longitudinal axis of the press. Instead of providing the flange 24b on a separate retainer, it may be an integral part of the die slide 14.

The die slide 14 is provided with a downwardly sloping opening 25 into which the unextruded or discard portion of a billet may be pushed at the end of the extrusion of a billet. The discard may thus be discharged from the press as will be clear from the lower left side of Fig. 3. The rods 26, 26 which extend through diagonal perforations in the slide 14 and across the opening 25 are removable and are inserted into their positions as illustrated by Figs. 2 and 3, only when it is desired to push a cold billet or a "sticker" through the opening 20 in the platen 12 and out of the rear of the press, instead of permitting it to drop through the opening 25.

Dowels 27 shown by Fig. 4 are provided on the die slide 14 and extend into a groove in the die backer plate 27a to prevent the die backer plate from turning.

The die slide 14 is also provided with two discard ejector plungers designated generally by the numerals 30, 30. One of these discard ejectors is shown in cross-section in Fig. 5 and the openings of the ejectors appear in Fig. 4. The locations of these ejectors are shown in dotted outline of Fig. 1. These ejectors are for the purpose of forcefully ejecting discard metal which may stick or jam in the discard slot 25 of the die slide.

Figure 5:
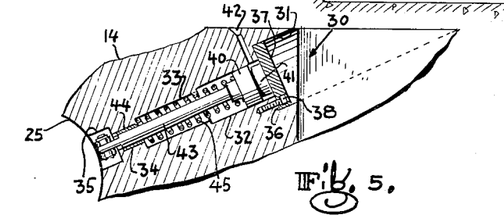
Fig. 5 is a fragmentary, transverse, cross-sectional view taken along the section line 5—5 of Fig. 1 showing the detail of one of the extrusion discard ejectors.
Figure 6:
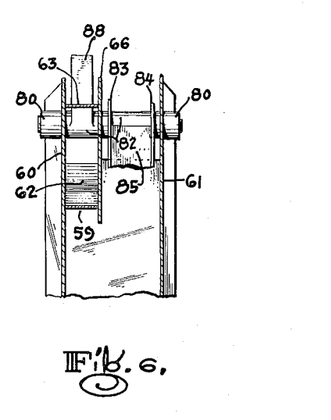
Fig. 6 is a fragmentary, longitudinal cross-section taken along the section line 6—6 of Fig. 3.

Referring specifically to Fig. 5, it will be seen that each of the discard ejectors 30, 30 is within and, in part, formed by openings which extend diagonally from the top of the die slide 14 to the discard slot 25, the axes of the openings being disposed in planes parallel to the face of the die slide. Each opening consists of five axially aligned sections 31, 32, 33, 34 and 35 of different diameters. Opening section 31 is for the purpose of giving access to the working mechanism of the ejector, while section 32 forms the air cylinder of the ejector.

Opening section 31 is larger in diameter than the adjacent section 32 and provides a shoulder 36 at its lower end which carries a circular plate 37, the lower face of plate 37 forming the end of the air cylinder of the ejector. The plate 37 is removably attached to the shoulder 36 as, for example, by suitable screws, one of which is shown at 38.

Section 32 carries a piston 40, which has an upper end section 41 of somewhat smaller diameter than that of section 32 to form a circular air channel around the upper end of the piston when it is positioned against the plate 37 as illustrated by Fig. 5. A perforation 42 is connected to a suitable source of compressed air and opens into section 32 at a location which permits the introduction of compressed air into the circular air channel around section 41 of the piston 40 when it is in its retracted position as illustrated.

The piston 40 carries the piston rod 43 which extends downwardly through sections 33 and 34 with its end in section 35, when the piston is in its retracted position. The piston rod 43 is slidably mounted in a bearing 44 in section 34. The coil spring 45 is positioned around the piston rod 43 in sections 32 and 33 and functions to retain the piston 40 in or return it to its retracted position when no air pressure is being applied to the piston 40.

When compressed air is introduced through the perforation 42, the piston 40 moves downwardly in the cylinder 32 compressing the coil spring 45 and causing the lower end of the piston rod 43 to move out of section 35 into the discard slot 25. This action of the piston 40 applies force through the piston rod 43 to eject any discard metal or "sticker" which is stuck in the slot 25. When the compressed air is shut off the piston 40 and the piston rod 43 are returned to their retracted position by the action of the coil spring 45 and the discard slot 25 is again ready to receive discard metal.

Figure 8:
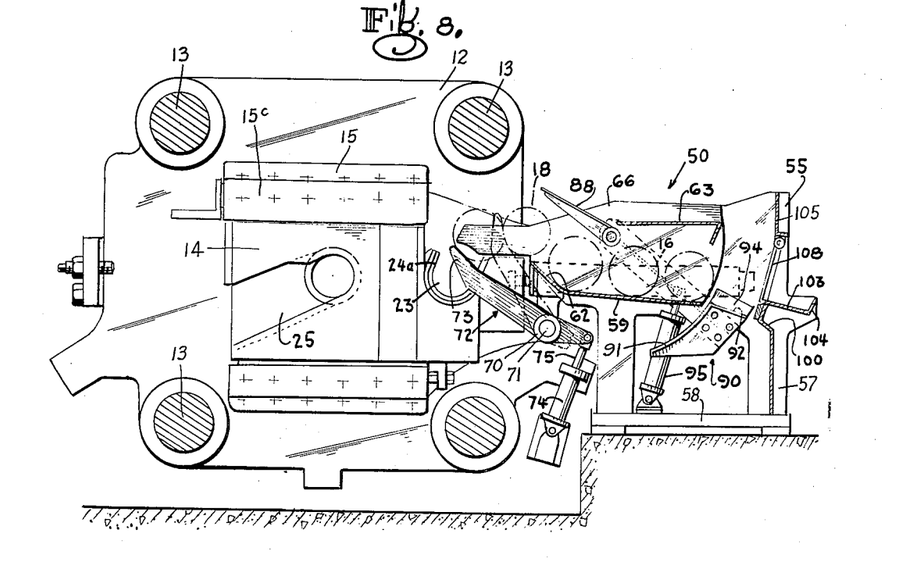
Fig. 8 is a schematic, cross-sectional view similar to Fig. 3, but on a reduced scale, showing the die slide in a retracted position and illustrating the position of the parts of the die changer at the end of its operation in removing a die from the die slide.
Figure 9:
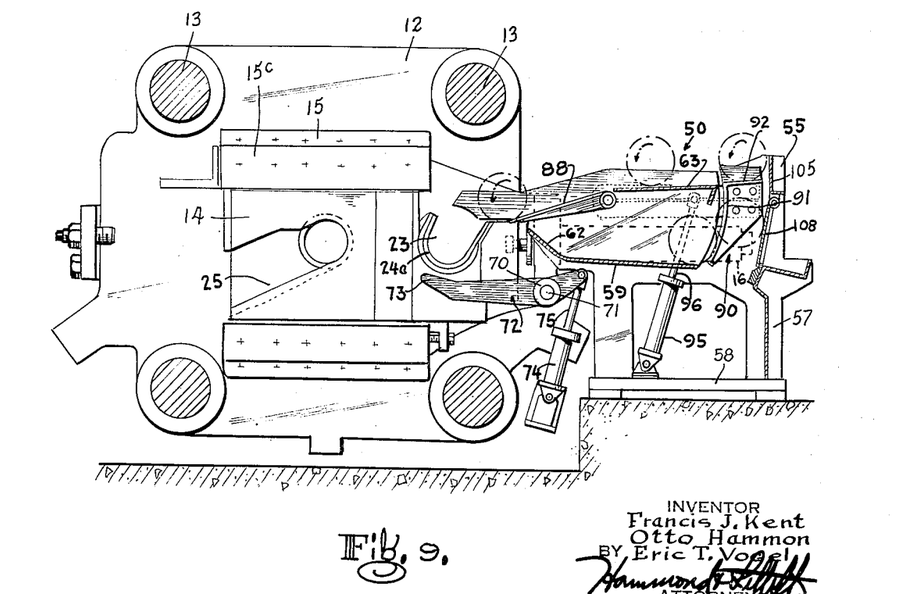
Fig. 9 is a schematic, cross-sectional view similar to Fig. 8 showing the die slide in a retracted position, but illustrating the position of the working parts of the die changer when returning a die to the die slide.

The die changer designated generally by the numeral 50 is fixedly positioned at the side of the press adjacent the die slide 14 and is adapted to mechanically remove a die 18 from the slot 23, when the die slide 14 has been retracted to a position as illustrated by Figs. 8 and 9, by the operation of the hydraulic retraction cylinder 16. The use of the die changer 50 permits the die to cool between extrusions, to be visually inspected and to be lubricated and given any other indicated service and if desired, to be removed from the press for repair or discard all without material delay in the operation of the press. It can be used to mechanically return a die 18 to the slot 23 and may be used to withdraw any die 18 which is revealed by the visual inspection to be worn or defective. Each of these operations are performed by the die changer 50, without manual handling of the die and without material delay in the operation of the press for the production of extrusions.

The die changer 50 is also adapted to alternatively position a die 18 and an obturating disk 51 (Fig. 2) in the slot 23, when the die slide 14 is in its retracted position. The obturating disks 51 are similar in outward shape to the dies 18 but have no hole therein. Such positioning of an obturating disk 51 in the die slide 14 and the return of the die slide to align the obturating disk 51 with the billet chamber 11 of the billet container 10, and the movement of the billet container to bring its orifice section 11 into contact with the obturating disk 51, seals the orifice of the billet container 10. Such sealing of the orifice of the billet container 10 permits the forging or the piercing of a billet within the container, as described, for example, in United States Patent No. 2,388,558 to Ludwig Loewy or in the United States Patent No. 2,491,897 to Hugo Lorant. The pierced and forged billets may then be extruded into hollow extrusions by inserting a die 18 and leaving the piercing mandrel in the mouth of the die during the extrusion as described in said patents. All this can be accomplished without manual handling of the die or obturating disks and in sufficiently short time that the billet does not cool below extrusion temperature.

Referring to Figs. 1, 2, 3 and 6, it will be seen that the die changer 50 positioned adjacent the die slide 14 of the press has a stationary frame generally indicated at 55, which comprises a body section 56 supported by four legs 57, 57 which are, in turn, attached to a base member 58. The longest dimension of the body section 56 is in alignment with a die 18 carried by the die slide 14 of the press.

The body section 56 has a sloping lower floor 59 and two parallel, fixed outer side walls 60 and 61, as well as an intermediate side wall or guide plate 66 parallel to the outer side walls 60, 61. The floor 59 extends between walls 60 and 66. An inclined section 62 of the floor is sloped at a greater angle to cause a die deposited thereon to roll backwardly along the inclined floor 59 and between walls 60 and 66 to the rear of the die changer frame. The body section also has an upper slightly inclined fixed floor 63 extending between the walls 60 and 66 and carried by these walls. The floor section 63 slopes forwardly and with the upper portions of the walls 60 and 66 forms a fixed chute along which a die will roll forwardly to be repositioned in the die slide slot 23 in die slide 14.

The side wall 60 has a rectangular window opening 64 below the level of the upper floor section 63 through which dies 18, 18 resting on the floor 59 of the die storage magazine may be visually inspected, lubricated and otherwise serviced. The outer side wall 60 has attached thereto the forwardly extending intermediate side wall or guide plate 66. This guide plate 66 is positioned with respect to the die slide 14 to guide a die 18 onto the sloping surface 62 of the floor 59, as the die is removed from the die slide. This guide plate 66 also functions to guide a die 18 into the die slot 23 of the die slide 14, as the die is being returned by the die changer.

The platen 12 is provided with a bearing 70 which carries one end of a pivot shaft 71 for a die remover arm 72. The longer end section 73 of the die remover arm 72 extends toward the die slide 14, and is positioned in such a manner and aligned with the die slide so that when the die slide is retracted by the action of the hydraulic cylinder 16, section 73 of the die remover arm may be raised by the operation of an air cylinder 74 to raise the arm section 73 against the protruding rim 18a of the die 18 (see Figs. 4 and 8) to lift the die out of the die slot 23 and deposit it on the inclined surface 62 from where it will roll toward the rear of the die changer frame 50. During this operation the die 18 is guided by and slides along the surface of the guide plate 66.

The air cylinder 74 is pivotally mounted on the platen 12 of the press and has its piston rod 75 pivotally attached to the shorter end section 76 of the die remover arm 72. The piston rod 75 is normally in an extended position as shown by Figs. 2, 3 and 9. When compressed air is supplied to the air cylinder 74 the piston rod 75 is retracted and the end section 73 of the die remover arm 72 is moved upwardly in a clockwise direction as shown by Fig. 8. When the die slide 14 is in its retracted position, this action of the air cylinder 74 causes the end section 73 to move upwardly in an arcuate path and to lift a die 18 positioned in the die slot 23 out of the slot as described hereinbefore.

Figure 7:
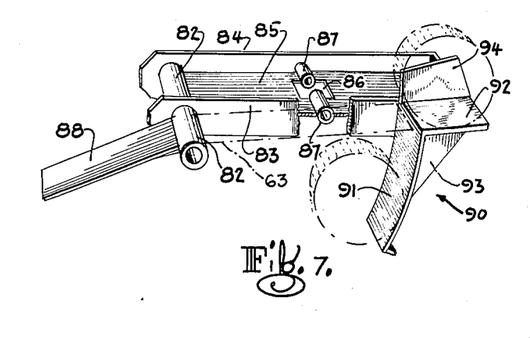
Fig. 7 is a perspective view of the loading arm and die cradle of the die changer.

The side walls 60 and 61 are perforated to receive bearings 80, 80 which carry the ends of a pivot shaft 81. A loading arm 88 and die cradle 90, the details of which are illustrated by Fig. 7, are pivotally mounted on the shaft 81 by means of the bearing cylinder 82. Referring specifically to Fig. 7, it will be seen that the bearing cylinder 82 is rigidly affixed to two backwardly extending parallel flat sections 83 and 84, and to the flat section 85 which is affixed along its edges to the sections 83 and 84. The sections 83 and 84 move in an arc between the side frame plate 61 and the intermediate plate 66. The member 85 is perforated at 86 and carries the bushings 87, 87 on each side of the perforation 86. The bearing cylinder 82 also carries the rigidly attached loading arm 88 in the form of a forwardly extending flat section which functions as a movable floor over which a die 18 rolls as it is returned to the die slot 23. The die cradle indicated generally by the numeral 90 is attached to the rearward end of section 83. This cradle 90 has a downwardly extending arcuate section 91, a flat die-carrying section 92, a reinforcing web 93 by which it is attached to section 83, and an upstanding guide section 94.

Referring to Figs. 2 and 3 it will be seen that an air cylinder 95 is pivotally attached to the base member 58 of the frame 55 of the die changer. The piston rod 96 is attached at its outer end to a shaft 97, the ends of which are positioned in the bushings 87, 87 of the loading arm and die cradle assembly. When the piston rod 96 is in its normally retracted position as illustrated by Figs. 2 and 3, the section 92 of the die cradle forms a backwardly sloping continuation of the floor 59 and the front section 88 is in elevated position leaving the passage onto the inclined section 62 and floor 59 of the die changer open.

The rear legs 57 of the frame 55 of the die changer 50 have a fixed transverse section 100 which carries a sloping portion 101. On its inner surface, the sloping portion 101 is provided with a stop plate 102 made of a metal, for example, soft copper, which is softer than the metal of the dies 18, 18 or of the obturating disks 51, 51. A die 18 or an obturating disk 51 rolling over the floor 59 and section 92 of the die cradle is stopped by rolling against the stop plate 102.

The fixed transverse section 100 has a backwardly sloping rear platform 103 and an upstanding stop 104 for the purpose of receiving discarded dies. The frame 55 also has a fixed transverse section 105 spaced above the transverse section 100, and extending between the side walls 60 and 61 near their back edges. The side walls 60 and 61 each have a bushed perforation 106 which carries the ends of a shaft 107 on which a door 108 is mounted. The door 108 is normally in closed position as illustrated by Figs. 2 and 3, to close the space between the transverse fixed sections 100 and 105 and prevent dies 18 from passing onto the platform 103, but can be pushed sidewise to open the passage to platform 103. The door 108 is manually controlled by a handle 110. When the handle 110 is pulled outwardly to the dotted line position of Fig. 1 the door 108 will be moved to the position where it closes the passage at the end of floor 59 and dies 18 will be prevented from passing through the opening closed by door 108. When the handle 110 is pushed inward to the full line position shown in Fig. 1 the passage to platform 103 will be left open and if desired a defective die may be withdrawn onto platform 103 to be repaired or discarded.

From the foregoing it will be appreciated that loading arm 88 and die cradle 90 are rigidly connected so as to be pivoted around the shaft 81 by the action of the air cylinder 95. The air cylinder 95 is adapted to pivot the die cradle 90 from its position as illustrated by Figs. 2 and 3, to a position in which its surface 92 is aligned with the upper edge of the die discard platform 103 and its arcuate section 91 forms an abutment at the end of floor 59, or by a full extension of its piston rod 96 to rotate the die cradle 90 through its entire arcuate path to bring its surface 92 into alignment with the edge of the upper sloping surface 63. When in the latter position the arm 88 will be moved to the position illustrated in Fig. 9 where it closes the passage onto the die support floor 59 and acts as a guide to roll the dies 18 into the die slot 23 in the die slide 14.

Furthermore, it will be noted that the angulation of the surface 92 of the die cradle 90 with respect to the remainder of the loading arm and die cradle assembly and the arcuate path of its travel are such that this surface slopes backwardly both in its position of rest (Figs. 2 and 3) and in the position in which it is in alignment with the upper edge of the transverse frame section 100, but slopes forwardly at the end of its arcuate path of travel where it is in alignment with the edge of the upper sloping floor section 63.

In the operation of the extrusion press in accordance with our invention to produce a solid extrusion, a hot billet is introduced into the billet container 10 and the billet container moved forwardly, while the die slide 14 is in the position illustrated by Figs. 1–4, inclusive, which aligns the die 18 with the billet chamber 11 of the billet container and the openings 19, 20 and 21. The forward movement of the billet container 10 is continued until the billet chamber 11 forms a fluid tight seal with the face of the die 18. The main ram of the press (not shown by the drawings) is then moved forwardly to extrude the hot billet under high pressure through the orifice of the die 18. The extrusion issuing from the die 18 passes through the perforations 19, 20 and 21 and out to the rear of the press. This extrusion is continued until only a minor portion of the billet and the pressing disc remain in the billet container 10.

At the end of the extrusion of the billet, the billet container 10 is withdrawn from the die 18 and the extruded piece drawn backwardly through the orifice of the die 18 for a short distance. The extruded piece is then cut off, as for example, by the use of a saw and the end of the extruded piece pulled through the die 18 and out of the perforations 20 and 21. The die slide 14 is then moved to its retracted position shown in Figs. 8 and 9, by the action of the hydraulic cylinder 16.

The billet container 10 is again moved forwardly to bring its orifice 11 adjacent the discard slot 25 of the die slide 14 which is now aligned with the perforations 19, 20 and 21. The main ram of the press is then advanced to force the residue or discard of the billet and the pressing disc into the discard slot 25. If it is desired to have discard pass on through the perforations 20 and 21, the rods 26, 26 are left in position as illustrated by Figs. 2 and 3. Alternatively, if it is desired to have the discard drop out through the discard slot 25, as is usually done, the rods are withdrawn from the die slide 14 and laid aside. Should the discard metal jam or stick in the discard slot 25, as sometimes happens, compressed air is supplied to the ejectors 30, 30 to cause their piston rods 43, 43 to advance against the discard metal and to force it out of the slot 25.

The die changer 50 may, if desired, be operated to remove the die 18 from the die slide 14 and replace it with another die in preparation for the next extrusion, while the foregoing operation of removing the discard metal is being carried out or it may be carried out after the discard removal operation is completed without further movement of the die slide 14. The movement of the die slide 14 to its retracted position for the removal of the discard metal brings the die slot 23 into position above the forward end 73 of the die remover lever 72 of the die changer 50 in a position where elevation of the lever 72 will remove the die from the die slot 23.

The operation of the die changer 50 in removing die 18 from the die slide 14 is schematically illlustrated by Fig. 8. To carry out this operation, compressed air is supplied to the air cylinder 74 to cause it to retract its piston rod 75, while the air cylinder 95 is left in its normal relaxed position. The retraction of the piston rod 75 pivots the die remover lever 72 and causes its end section 73 to travel upwardly in an arcuate path towards the die slot 23 and to lift the die 18 out of that slot and deposit it on the sloping section 62 of the floor 59. The die 18 is guided onto the floor 59 after it leaves the die slot by the guide plate 66. Upon being deposited upon the sloping surface of section 59, the die rolls along the floor between the side walls 60 and 66 until it is stopped by coming into contact with the stop plate 102 or into contact with another die 18.

The die 18 is now in the inspection zone of the die changer 50. This zone is defined by the fixed floor 59, section 92 of the die cradle, the lower parts of the side walls 60 and 66 and the stop plate 102. The die 18 is ordinarily hot when it is removed from the die slide 14 and can be permitted to cool in this inspection zone. In this zone the orifice of the die 18 is opposite the rectangular opening 64 in the side wall 60, through which it can be visually inspected, lubricated and otherwise serviced.

The operation of the die changer 50 in returning a die 18 to the die slide 14 is schematically illustrated by Fig. 9 in which different positions of a die or obturating disk in rolling along the floor 63 and into the die slot 23 are illustrated in broken lines. As will be appreciated from the foregoing description of the travel of a die 18 across the inspection zone, there is a die resting on the section 92 of die cradle 90, at any time there is one or more dies in this zone.

Should inspection reveal that the particular die 18 resting on the surface of section 92 is suitable for further service, compressed air is supplied to the air cylinder 95 to cause its piston rod 96 to become fully extended, while the air cylinder 74 is in its normal position in which its piston rod 75 is extended, and the door 108 is in closed position. The extension of the piston rod 96 causes the die cradle 90 to travel over its full arcuate path to place the surface of its section 92 in alignment with the fixed upper floor 63 of the die changer. The die 18 resting on the surface of section 92 is carried upwardly, while being guided by the upstanding section 94 of the cradle 90.

When the surface of section 92 comes into alignment with the fixed upper floor 63, the die rolls off of section 92 and down the slope of the floor 63. The flat section 88 has traveled downwardly in an arcuate path during the travel of the die cradle 90 upwardly and has come into position as a continuation of the floor 63 to the die slot 23 in the die slide 14. The die 18 rolling down the slope of the floor 63 continues along section 88, while being guided by the guide plate 66, and falls into the die slot 23 of the die slide 14 so as to assume its operational position with respect to the die slide 14. During this operation it is not necessary to touch or handle the die manually or by tools or otherwise. Lubrication may be applied to the dies 18 by swabbing or spraying through the window 64.

Should visual inspection reveal that the particular die 18 which is resting on the surface of section 92 is worn or otherwise defective, it is discarded from the die changer 50. This is accomplished by introducing into the air cylinder 95 an amount of compressed air which will cause its piston rod 96 to be extended by an amount which raises the die cradle 90 to bring the surface of its section 92 into alignment with the upper edge of the die discard platform 103. At the same time, the door 108 is pushed sidewise to leave the passage to platform 103 open. The opening of the passage to platform 103 and the backward slope of the surfaces of sections 92 and 103 causes the die to roll backwardly until it comes to rest against the stop 104. In this position outside the body section 56 of the die changer, the worn or defective die which has now cooled is readily accessible for conveyance to any desired location. If desired the die cradle 90 may be raised to the full stroke position illustrated in Fig. 9 and as the die passes the opening to the platform 103 it will automatically roll onto the platform for discard.

As mentioned hereinbefore, the extrusion press in accordance with this invention in the extrusion of hollow sections is particularly well suited for the forging and piercing of a billet before it is extruded. At the beginning of such an operation, an obturating disk 51 having a groove similar to groove 22 in the dies 18 is positioned in the die slot 23 of the die slide 14 and a die 18 is positioned on section 92 of the visual inspection zone of the die changer 50. If desired, a second obturating disk 51 may be positioned adjacent and in front of the die 18 on section 92 and a second die positioned adjacent and in front of the obturating disk 51 in the visual inspection zone of the die changer 50. Thus, the obturating disks 51 and the dies 18, 18 are positioned for alternative delivery to the press.

A hot billet is positioned in the billet container 10 and the container is moved forwardly with the obturating disk 51 in the die slide 14 in alignment with billet chamber 11, until the billet chamber is sealed by the obturating disk 51. The hot billet is then forged by the action of the main ram of the press and/or pierced by a mandrel operating by a piercing ram of the press. After the forging or piercing operation, or both, the billet container 10 is retracted from the die slide 14, and the die slide 14 is withdrawn to its retracted position by the action of the hydraulic cylinder 16.

The now hot obturating disk is removed from the die slide 14 by operating the arm 72 of the die changer 50, in exactly the same manner as described hereinbefore with reference to Fig. 8 for the removal of a die 18 from the die slide and the obturating disk is rolled onto the floor 59. The die 18 resting on section 92 of the die cradle 90 is then delivered to the die slide 14 exactly as described hereinbefore with reference to Fig. 9. The die slide 14 is then returned to its original position by the action of the hydraulic cylinder 16 to place the die 18 in alignment with the billet chamber 11 of the billet container 10, which is then advanced to a position against the die 18. All these changes can be made quickly and without permitting the pierced billet to cool below extrusion temperature.

The piercing mandrel is then further advanced to position its end within the orifice of the die 18, in case hollow extrusions are to be formed. The hot billet is then largely extruded, the billet container 10 withdrawn from the die slide 14, and the die slide 14 moved to its retracted position by the action of the hydraulic cylinder 16. The discard metal is then pushed from the billet container into the slot 25 as described hereinbefore. At the same time or thereafter, the die 18 is removed from the die slide 14 and the obturating disk now resting on section 92 of the cradle 90 is returned to the die slide by the operation of the die changer 50, and the operation repeated.

From the foregoing, it will be appreciated that in the operation of the extrusion press in accordance with our invention, the dies or obturating disks as the case may be are at no time handled manually inside the press. This is a particularly advantageous feature, inasmuch as the manual removal of a hot die from the press is a difficult operation. The manual replacement of a cool die in the press is almost as difficult since the dies have a considerable weight.

It will also be appreciated that the replacement of a die or the substitution of a die for an obturating disk in the extrusion press, in accordance with our invention, is a fast operation which can be completed while the discard metal is removed from the press and which therefore adds nothing to the period during which the press is not actually extruding metal. This materially increases the production time for the production of extrusions by the press.

A further advantage of our invention is the efficiency and rapidity with which an obturating disk and a die can be alternatively placed in operative position in the production of hollow extrusions or of extrusions from billets which are forged or upset prior to their extrusion.

While we have illustrated and described certain preferred embodiments of the improved extrusion press in accordance with our invention and a preferred method of performing extrusion operations, it will be understood that various modifications and changes may be made in embodiments illustrated and the method of operation described without departing from the scope and spirit of our invention as defined by the following claims.

We claim:

1. In a metal extrusion press, the combination of a die slide adapted to be moved horizontally and transversely of the longitudinal main axis of the press, said die slide having a die slot adapted to receive a die having a generally cylindrical outer surface and to retain the die in a fixed position normal to the longitudinal axis of the press and to permit its removal by an upward movement transversely to the longitudinal axis of the press, a die in said die slot extending forwardly therefrom, a die changing mechanism including a visual inspection zone; said inspection zone being formed by two side walls one of which has an opening through which a die within the zone may be visually inspected, a fixed back end section forming a stop to the travel of a die within the inspection zone, a fixed floor section which slopes backwardly and downwardly relative to the main axis of the press, and a first movable floor section adjacent the said back end section which normally slopes backwardly and downwardly; an upper fixed chute section formed by a fixed forwardly and downwardly sloping floor and the upper portions of the said side walls, a second movable floor section between said upper fixed chute and said die slot, a die removal arm pivoted on said press, means to move said die removal arm to move a die upwardly out of said die slot and to deposit it on the sloping surface of said die changing mechanism whereby the die is caused to roll backwardly and downwardly into said inspection zone and come to rest on the said first movable floor of the visual inspection zone, means to raise the said first movable floor and a die positioned thereon, while changing the angulation of the said first floor from a backward to a forward slope, to the level of the floor of the said upper chute section, and means to simultaneously lower said second movable floor section to a position in which it forms a forwardly continuation of the sloping floor of the said upper chute section to the edge of the said die slot in the die slide, to thereby cause the said die to roll forwardly along the fixed floor of the chute, along the second movable floor section and to fall into the said die slot of the die slide.

2. In a metal extrusion press, the combination of a die slide adapted to be moved horizontally and transversely of the main axis of the press, said die slide having a die slot adapted to receive a die having a generally cylindrical outer surface, to retain the die in a fixed position normal to the longitudinal axis of the press and to permit its removal by an upward movement transversely to the longitudinal axis of the press, a metal discard slot in said die slide, a die changing mechanism including a visual inspection zone; said inspection zone being formed by two side walls one of which has an opening through which a die within the zone may be visually inspected, a fixed back end section forming a stop to the travel of a die within the inspection zone, a removable door positioned above said fixed back end section, a fixed floor which slopes backwardly, and a first movable floor section adjacent the said back end section which normally slopes backwardly; an upper fixed chute section formed by a fixed forwardly sloping floor and the upper portions of the said side walls, a second movable floor section between said fixed chute and said die slot, a die removal arm connected to said press, means to move said die removal arm to remove a die having a cylindrical outer surface from said die slot and to deposit it on the sloping floor of the visual inspection zone of said die changer whereby the die is caused to roll backwardly in the said inspection zone and come to rest on the said first movable floor of the visual inspection zone, and means to raise the said first movable floor and a die positioned thereon to the upper edge of the said fixed back end section while maintaining the backward slope of the said floor to cause the said die to roll backwardly through said door opening and out of said inspection zone when said door is open, said latter means being adapted to raise the said first movable floor and a die positioned thereon, while changing its angulation from a backward slope to a forward slope, to the level of the floor of the upper chute section and to simultaneously lower said second movable floor section to a position in which it forms a forward continuation of the sloping floor of the said upper chute section to the edge of the said die slot in the die slide, whereby said die is caused to roll forwardly along the removable floor section and to roll into the said die slot of the die slide.

3. In an extrusion press, a platen, a die slide holder mounted on said platen, a die slide in said die slide holder, a die changing mechanism comprising a visual inspection zone; said inspection zone being formed by two side walls one of which has an opening through which a die within the zone may be visually inspected, a back end section forming a stop to the travel of a die within the inspection zone, a fixed floor which slopes rearwardly from the extrusion axis of said press, and a movable floor section adjacent the said back end section; an upper fixed chute section formed by a forwardly sloping floor and the upper portions of the said side walls, means connected to said press for moving a die having a generally cylindrical outer surface from its operative position within the press and placing it on the sloping surface of the said inspection zone and thereby causing it to roll backwardly in the said inspection zone, means for moving a die from the said inspection zone to its operative position within the press which includes means for raising the said movable floor section of the inspection zone and a die positioned thereon and causing the die to roll into the said upper chute section, and an additional movable floor section adapted to move into position to form a continuation of the floor of the said chute section toward said extrusion axis of the press.

4. In an extrusion press, a die changing mechanism connected to said press comprising a visual inspection zone; said inspection zone being formed by two side walls one of which has an opening through which a die within the zone may be visually inspected, a back end section including a stop to the travel of a die within the inspection zone, a movable door, a fixed floor which slopes backwardly, and a first movable floor section adjacent the said back end section; an upper fixed chute section formed by a forwardly sloping floor and the upper portions of the said side walls, one end of said chute section being arranged to cooperate with said first movable floor section, a second movable floor section at the other end of said chute, means mounted on said press for moving a die having a generally cylindrical outer surface from its operative position in the press and placing it on the sloping surface of the said inspection zone and thereby causing it to roll backwardly within the inspection zone, and means selectively controllable to discharge a die from the said inspection zone and to move a die from the inspection zone to its operative position within the press, including means for raising the said first movable floor section of the inspection zone and a die positioned thereon to the level of the bottom of the said door and causing the die to roll through the said door when it is opened and for raising the die positioned thereon to the level of the said upper fixed chute section and causing said die to roll along the upper chute section and along said second movable floor section and into its operative position in the press.

5. In an extrusion press, a platen, a die slide, means to move the die slide on the face of the platen, said die slide having a horse shoe shaped die slot, a die positioned in said die slot and extending forwardly therefrom, a die changer mechanism comprising inclined lower and upper chutes, an arm pivoted on said platen, piston and cylinder means to move said arm to engage the forwardly extending portion of said die to remove said die from said die slide and deliver it into the lower chute of said die changer where it rolls away from said press, an elevator to lift a die from said lower chute to said upper chute, and a pivoted arm on said upper chute down which said die rolls to deliver said die into said horse shoe shaped die slot.

6. In a metal extrusion press having a platen with an opening therethrough, a die adapted to register with said opening, a billet container having an opening in line with said opening in the said platen, said billet container being movable toward and away from said die and said platen when said die is in registry with the opening in said platen, a die slide movable on the face of said platen to move said die transversely out of and into registry with the opening in said platen said die slide having a horse shoe shaped die slot, a die removing arm mounted on said press adjacent said die slide for removing a die transversely from said horse shoe shaped die receiving slot while said die is in a position out of registry with the opening in said platen and depositing said removed die on an inclined chute down which said die rolls by gravity into a zone in which it may be visually inspected, means to operate said die removing arm, and elevator means at the lower end of said inclined chute for elevating a new die and delivering it on to a second inclined chute down which said new die rolls into said die slot in said die slide while the said die slide is in position to receive the die at a location in which it is out of registry with the opening in said platen.

7. The combination of claim 1 in which said die slide also has a discard slot therein through which discard metal can be removed out of said press and assembly pins for temporarily blocking the exit of said discard slot so that a cold billet may be pushed over said pins and through said die slide instead of dropping down through said discard slot.

8. In a metal extrusion press having a platen with an opening therethrough, a die adapted to register with said opening, a billet container having an opening in line with said opening in the said platen, a die slide between said billet container and said platen, said billet container being movable toward and away from said platen along the axis of said opening to clamp said die slide with a die therein between said platen and said billet container during extrusion operations and to release said die slide for sliding movement on the face of the platen between extrusion operations, said die slide being movable on the face of said platen, said die slide having a horse shoe shaped die receiving slot, a die in said slot extending forwardly therefrom and a die removing arm mounted on said press adjacent said die slide for engaging the forward extension of said die for removing said die from said slot in said die slide, and depositing said die in a die changer, a rearwardly sloping chute in said die changer down which said die rolls to a die storage magazine, elevator means to lift a die out of said die storage magazine and deposit it on a chute sloping forwardly toward said horse shoe shaped die slot, a pivoted loading arm at the front of said forwardly sloping chute down which said die rolls into said die slot and connecting members between said elevator means and said pivoted loading arm to lower said loading arm when said elevator means is raised and to raise said loading arm when said elevator means is lowered.

References Cited in the file of this patent

UNITED STATES PATENTS

| | | | |
|---|---|---|---|
| 396,923 | Foreman | Jan. 29, | 1889 |
| 1,317,238 | Summey | Sept. 30, | 1919 |
| 2,388,558 | Loewy | Nov. 6, | 1945 |
| 2,491,897 | Lorant | Dec. 20, | 1949 |
| 2,720,970 | Roux | Oct. 18, | 1955 |
| 2,728,453 | Thweatt et al. | Dec. 27, | 1955 |
| 2,731,123 | Edgecombe | Jan. 17, | 1956 |
| 2,738,063 | Billen | Mar. 13, | 1956 |
| 2,880,867 | Keck | Apr. 7, | 1959 |

FOREIGN PATENTS

| | | | |
|---|---|---|---|
| 602,176 | Germany | Sept. 3, | 1934 |